United States Patent
Khan et al.

(10) Patent No.: US 12,294,942 B2
(45) Date of Patent: May 6, 2025

(54) METHOD AND DEVICE FOR COMMUNICATION BETWEEN A VEHICLE AND A PUBLIC LAND MOBILE NETWORK

(71) Applicant: PSA AUTOMOBILES SA, Poissy (FR)

(72) Inventors: Sharique Khan, Orsay (FR); Alexandre Fromion, Antony (FR)

(73) Assignee: Stellantis Auto SAS, Poissy (FR)

( * ) Notice: Subject to any disclaimer, the term of this patent is extended or adjusted under 35 U.S.C. 154(b) by 347 days.

(21) Appl. No.: 17/794,773

(22) PCT Filed: Jan. 27, 2021

(86) PCT No.: PCT/FR2021/050146
§ 371 (c)(1),
(2) Date: Jul. 22, 2022

(87) PCT Pub. No.: WO2021/176150
PCT Pub. Date: Sep. 10, 2021

(65) Prior Publication Data
US 2023/0073015 A1    Mar. 9, 2023

(30) Foreign Application Priority Data
Mar. 4, 2020 (FR) ......................... 2002170

(51) Int. Cl.
*H04W 52/00* (2009.01)
*H04W 4/44* (2018.01)
*H04W 52/02* (2009.01)

(52) U.S. Cl.
CPC ......... *H04W 52/0212* (2013.01); *H04W 4/44* (2018.02)

(58) Field of Classification Search
CPC ............................ H04W 52/0212; H04W 4/44
See application file for complete search history.

(56) References Cited

U.S. PATENT DOCUMENTS

2015/0341862 A1* 11/2015 Lei .................... H04W 52/0241
                                                                 370/311
2016/0165542 A1* 6/2016 Mori ..................... H04W 4/80
                                                                 370/311
(Continued)

FOREIGN PATENT DOCUMENTS

GB          2558898 A       7/2018
WO     2018225990 A1      12/2018

OTHER PUBLICATIONS

International Search Report for PCT/FR2021/050146 mailed Mar. 19, 2022.
Written Opinion for PCT/FR2021/050146 mailed Mar. 19, 2022.

*Primary Examiner* — Erika A Washington
(74) *Attorney, Agent, or Firm* — Sandberg Phoenix & von Gontard P.C.

(57) ABSTRACT

The invention relates to a method and a device for communication between a communication system of a vehicle (10) and a public land mobile network (100). To this end, a first piece of information representative of the current power consumption of the vehicle (10) is received; a second piece of information representative of an amount of electricity available in the vehicle (10), for example in the battery of the vehicle (10), is received; and a third piece of information representative of the target time during which the vehicle (10) wishes to remain connected to the network (100) is received. Based on the first, second and third pieces of information, the network (100) determines which power saving mode should be assigned to the communication system of the vehicle (10) so that the vehicle can maintain a connection to the network (10) for the desired time.

8 Claims, 2 Drawing Sheets

(56) References Cited

U.S. PATENT DOCUMENTS

2019/0306799 A1\* 10/2019 Nakagawa ............ H04W 76/25
2020/0280917 A1\* 9/2020 Hua ...................... H04W 76/28

\* cited by examiner

METHOD AND DEVICE FOR COMMUNICATION BETWEEN A VEHICLE AND A PUBLIC LAND MOBILE NETWORK

CROSS-REFERENCE TO RELATED APPLICATIONS

This application is the US National Stage under 35 USC § 371 of International Application No. PCT/FR2021/050146, filed 27 Jan. 2021 which claims priority to French Application No. 2002170 filed 3 Apr. 2020, both of which are incorporated herein by reference.

BACKGROUND

The invention relates to a method and a device for communication between a vehicle and a public land mobile network, for example a 4G or 5G cellular network. The invention also relates to a method and a device for optimizing the power consumption for maintaining a connection between the vehicle and the network for a determined time.

TECHNOLOGICAL BACKGROUND

Modern vehicles carry one or more devices requiring the maintenance of a connection with a network, for example a wireless cellular network. These devices correspond, for example, to computers, also called electronic control units (ECU), or to telematic control units (TCU). The computers, for example, carry one or more software programs that are run to ensure the functions for which they are responsible. Updates to this software are sometimes necessary, for example to improve a function or to correct an error (or computer bug. These computers or these units also allow the feedback of information to servers, emergency services or even data centers of the builders or manufacturers of automobile parts.

These data exchanges are for example carried out by air, according to a technology called OTA ("over-the-air") for downloading updates. This technology relies on one or more public land mobile networks in the same way as all cellular communications.

The communications established between a vehicle and the network consume power, in particular at the vehicle, the electrical energy of which is supplied by one or more batteries. The amount of electrical energy available in the vehicle is limited, in particular when the vehicle is in a situation in which the battery is not recharging.

Maintaining communications between the vehicle and the network can thus deplete the amount of energy available in the vehicle, which can be problematic when for example the vehicle is not used for a long period and the vehicle battery cannot be recharged.

SUMMARY

An object is to optimize communications between a vehicle and a land mobile network.

Another object is to optimize the power consumption by the vehicle to ensure the maintenance of a connection with the land mobile network.

According to a first aspect, a method of communication between a communication system of a vehicle and a public land mobile network is disclosed, the vehicle being static in a cell of the network, the method being implemented by the network, the method comprising the following steps:

receiving a first piece of information representative of the power consumption of the vehicle;

receiving a second piece of information representative of an amount of electricity available in the vehicle;

receiving a third piece of information representative of a determined target time for maintaining a connection between the communication system and the network;

determining at least one power saving mode to be assigned to the communication system of the vehicle as a function of the first piece of information, the second piece of information and the third piece of information; and sending the communication system of the vehicle an instruction to switch to the at least one determined power saving mode.

According to a variant, the determination of at least one power saving mode comprises selecting a mechanism for putting the communication system of the vehicle to sleep at regular intervals of determined duration from among a plurality of mechanisms supported by the network.

According to another variant, the plurality of mechanisms comprises:

a power saving mode mechanism (PSM);
a discontinuous reception mechanism (DRX);
an extended discontinuous reception mechanism (eDRX); and
a continuous reception mechanism in connected mode (CDRX).

According to yet another variant, the determination of at least one power saving mode comprises selecting a power saving profile from among a plurality of power saving profiles, each profile of said plurality of profiles being associated with a set of applications and/or services to be kept active with a set of associated communication parameters, the set of communication parameters comprising:

a frequency of data exchanges; and/or
a data packet size.

According to a further variant, the plurality of power saving profiles comprises a profile for which only one or more emergency services are kept active.

According to another variant, the selection of a power saving profile is based on a virtual image of the communication system of said vehicle recorded in the network.

According to a second aspect, a device of the public land mobile network is disclosed which is configured to communicate with a communication system of a vehicle, the device comprising a memory associated with a processor configured to implement the steps of the method according to the first aspect.

According to a third aspect, a communication system is disclosed which comprises a device as described above according to the second aspect and at least one vehicle connected to the public land mobile network via a wireless link.

According to a fourth aspect, a computer program is disclosed that comprises instructions stored in non-volatile memory suitable for executing the steps of the method according to the first aspect, in particular when the computer program is executed by at least one processor.

Such a computer program may use any programming language, and be in the form of source code, object code, or intermediate code between source code and object code, such as in a partially compiled form, or in any other desirable form.

According to a fifth aspect, a computer-readable recording medium is disclosed on which a computer program is recorded that comprises instructions for executing the steps of the method according to the first aspect.

On the one hand, the recording medium may be any entity or device capable of storing the program. For example, the medium may comprise a storage means, such as a ROM memory, a CD-ROM or a ROM memory of the microelectronic circuit type, or even a magnetic recording means or a hard disk.

On the other hand, this recording medium may also be a transmissible medium such as an electrical or optical signal, such a signal being able to be conveyed via an electrical or optical cable, by conventional or hertzian radio or by self-directed laser beam or by other means. The computer program may in particular be downloaded from an Internet-type network.

Alternatively, the recording medium may be an integrated circuit in which the computer program is incorporated, the integrated circuit being suitable for executing or being used in the execution of the method in question.

BRIEF DESCRIPTION OF THE FIGURES

Other features and advantages of the method and device will emerge from the description of the non-limiting embodiments below, with reference to the appended FIGS. 1 to 3, in which.

DETAILED DESCRIPTION

A method and a communication device between a communication system of a vehicle and a public land mobile network will now be described in the following with joint reference to FIGS. 1 to 3. Like elements are identified with like reference signs throughout the description that follows.

According to a particular and non-limiting embodiment, a communication method between a communication system of a vehicle and a public land mobile network comprises receiving a first piece of information representative of the current power consumption of the vehicle, a second piece of information representative of an amount of electricity available in the vehicle, for example in the battery of the vehicle, and a third piece of information representative of the target time during which the vehicle wishes to remain connected to the network. Based on the first piece of information, the second piece of information and the third piece of information, the network determines which power saving mode must be assigned to the communication system of the vehicle so that the vehicle can maintain a connection with the network for the desired time. The network then sends the vehicle the power saving mode to which the communication system must switch.

Communication to the network by the vehicle of information relating to its power consumption, its power resources and its objectives in terms of connection time allows the network to establish the appropriate mechanisms to satisfy the vehicle's requirements in terms of connection maintenance. This makes it possible to optimize the power resources available at the vehicle level to maintain a connection with the network.

Although the description below relates to a method and a device for communication between a communication system of a vehicle and a public land mobile network, the method and device are not limited to such an embodiment. The method and a device extend to communication between any mobile communication device (for example, a smartphone, a tablet, a connected object) and any mobile network.

Figure 1:
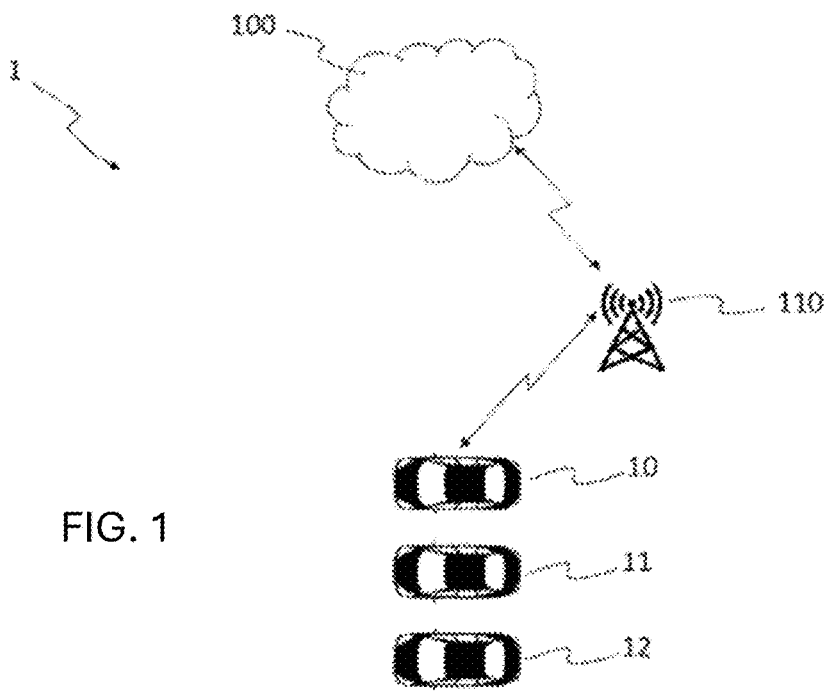
FIG. 1 schematically illustrates a communication environment between a vehicle and a public land mobile network infrastructure.

FIG. 1 schematically illustrates a communication environment 1 between a vehicle 10 and a public land mobile network infrastructure.

FIG. 1 illustrates a vehicle 10 parked, for example in a parking space of a parking lot or a garage, and communicating with one or more remote servers or the cloud 100 through one or more communication devices 110 of the cellular network relay antenna type, forming part of the infrastructure of the public land mobile network. The public land mobile network advantageously corresponds to a network of the cellular type, for example a 3GPP network ("$3^{rd}$ Generation Partnership Project") of fourth generation or fifth generation, called 3GPP 4G or 5G, respectively.

The vehicle 10 is for example part of a set of vehicles 10, 11, 12 that are stationary for a determined time, for example a few days, weeks or months.

The vehicle 10 notably comprises a communication system supplied with electrical power by a battery having a determined capacity. The communication system for example comprises a communication device, for example a TCU, connected to one or more computers of the on-board system of the vehicle 10. The computer(s) correspond for example to computers that upload data (for example from sensors of the vehicle 10) to one or more cloud servers 100 via a wireless connection conforming to the LTE (Long-Term Evolution), LTE-Advanced or 3GPP 5G standard and/or receiving data from this or these servers.

The amount of electricity corresponds to an amount that is expressed in ampere-hours (noted Ah, which is a unit of electric charge, 1 Ah corresponding to the amount of electricity crossing a section of a conductor traversed by a current with an intensity of 1 amp for 1 hour). The amount of electrical power corresponds to an amount that is expressed in watt-hours (or kilowatt-hours, denoted kWh, 1 kWh corresponding to the amount of power consumed by a 1000 watt device for 1 hour). It is possible to switch from one unit to the other by using, for example, the nominal voltage V at the terminals of the battery of the vehicle 10, with Ah*V=>Wh.

The state of charge (SOC) of the battery, or the depth of discharge (DOD), indicate the charge level of the battery. Such information is, for example, obtained by means of a BMS (Battery Management System) associated with the battery or by a computer receiving the parameters of the battery to establish the SOC.

The elements forming the communication system are, for example, interconnected via a wired network, for example a CAN (Controller Area Network), CAN FD (Controller Area Network Flexible Data-Rate), FlexRay (according to the ISO 17458 standard) or Ethernet (according to the ISO/IEC 802.3 standard) type network.

The vehicle 10 is advantageously static, or quasi-static, in a cell of the mobile network with which one or more communications are established. The cell corresponds to a geographical coverage area of a communication antenna (also called base station), for example, the antenna 110, making it possible to establish radio communications between the vehicle 10 and the network infrastructure of the mobile network.

According to a particular embodiment, the mobile network is a 3GPP 5G-type network. According to this example, the network is divided into network slices, based on SDN (Software-Defined Networking) and/or NFV (Network Function Virtualization) type technologies. A network slice corresponds to a form of virtual network architecture, that is to say, to a logical instance of the land mobile network. Dividing a network into slices allows the creation of multiple virtual networks on a common shared physical infrastructure. Each network slice is allocated a set of resources dedicated by the network operator for a specific use by a given customer (e.g. an automotive supplier) or for a particular device, for example for the communication system of the vehicle 10. Such a division of the 3GPP 5G public land mobile network is for example described and defined in the specification document titled "5G; System Architecture for the 5G System," referenced ETSI TS 123 501 version 15.2.0 and published in June 2018. According to a variant, the vehicle 10 accesses one or more network slices to access the services associated with these network slices, a determined service being associated with a slice of the network. Each network slice corresponds to an end-to-end virtual network, that is to say, from the vehicle 10 to the machine, physical or virtual, of the cloud 100 providing the associated service.

In a first operation, a first piece of information representative of the current power consumption of the vehicle 10, a second piece of information representative of an amount of electricity available in the vehicle 10 and a third piece of information representative of an objective of maintaining a connection between the communication system of the vehicle 10 and the network for a determined time are received by the network, for example by one or more servers of the cloud 100. These pieces of information are transmitted by the vehicle 10 via a wireless link, for example at the request of the network, or at the initiative of the communication system of the vehicle 10, periodically or aperiodically. The wireless link is an OTA-type link, for example, and conforms to a wireless communication standard, such as the LTE, LTE-Advance or 3GPP 5G standard.

The first piece of information corresponds for example to the quantity of electricity supplied by the battery at a given instant, this first piece of information for example being obtained from the BMS system associated with the battery.

The second piece of information for example corresponds to the quantity of electricity remaining in the battery at the moment when the first piece of information was provided, this second piece of information corresponding for example to the state of charge (SOC) or to the depth of discharge (DOD) obtained for example from the BMS system associated with the battery.

The third piece of information corresponds for example to the time (expressed for example in hours or days) during which the vehicle 10 wishes for communications with the mobile network to be maintained. This third piece of information corresponds, for example, to a time determined according to the environment and the situation in which the vehicle finds itself. This time is, for example, predetermined, that is to say, stored in the memory of the communication system. According to a variant, this time is a parameterizable value, for example a value entered by a user of the vehicle via a man-machine interface (MMI).

In a second operation, the network determines one or more power saving modes to be assigned to the communication system of the vehicle 10 as a function of the first, second and third pieces of information received.

According to a first particular embodiment, a first power saving mode corresponding to a sleep mechanism of the communication system of the vehicle 10 is determined. This mechanism assigned to communications between the communication system of the vehicle 10 and the network is advantageously selected from a list of mechanisms that are available and compatible with the communication standard of the mobile network (for example LTE, LTE-Advanced or 3GPP 5G). The mechanism is selected according to the parameters provided by the vehicle 10 and corresponding to the first, second and third pieces of information received. The selected mechanism corresponds for example to one of the following mechanisms:

PSM (Power Saving Mode) mechanism: this mechanism makes it possible to turn off the radio of the vehicle's radio system for an extended period; according to this mechanism, the radio system remains attentive to the paging channel once it has entered a rest or standby state for a determined active time characterized by a timer named T3324; once this timer has elapsed, the radio system of the vehicle 10 can no longer be reached by the network or the cloud 100, since the radio of the radio system is deactivated for a time corresponding to the timer named T3412; the timers T3324 and T3412 are for example determined by the network or the cloud 100;

DRX (Discontinuous Reception) mechanism: this mechanism makes it possible to turn off the radio of the vehicle's radio system in order to turn it back on periodically so as to monitor the PDCCH channel (Physical Downlink Control Channel), according to a cycle called DRX cycle, which corresponds to a period during which the radio module is at rest ("DRX sleep") alternating with a period of "DRX Active State" activity); DRX cycle values vary between 2 ms and 640 ms, with the active period value between 1 and 200 ms;

eDRX (Extended Discontinuous Reception) mechanism: this mechanism corresponds to an extended mode of the DRX mechanism, i.e. the period of inactivity of the radio module can be extended compared to that of the DRX mechanism; according to this mechanism, the paging interval can be extended to values between 5.12 seconds and 2621.44 seconds, i.e. the radio system of the vehicle 10 can be in a rest or standby state during the paging interval, the radio module of the radio system waking up at each end of the interval to listen to the PDCCH (Physical Downlink Control Channel) logical channel on which the RRC (Radio Resource Control) paging message is transmitted by the server of the cloud 100 to notify the vehicle 10 that data is awaiting transmission to its radio system;

CDRX (Connected Mode Discontinuous Reception) mechanism: this mechanism corresponds to a connected mode of the DRX mechanism, i.e. according to the CDRX mechanism, the DRX short cycle is optional, and if it is not enabled only the DRX long cycle is executed.

Of course, the sleep mechanisms in the above list are provided by way of example, and the sleep mechanisms of the vehicle communication system 10 are not limited to the above examples.

The examples in the list above are mechanisms known to those skilled in the art and conform to LTE standards. These mechanisms are, for example, described in the book written by Olof Liberg et al. and titled "Cellular Internet of Things: from massive deployments to critical 5G."

According to a second particular embodiment, a second power saving mode corresponding to a power saving profile assigned to the communication system of the vehicle 10 is determined. The assigned profile is for example selected from a list of determined power saving profiles. Each profile corresponds for example to a reduced list of applications or services that are kept active, with associated communication parameters, the list being all the more reduced as the power saving to be achieved is significant. The profile is advantageously selected according to the parameters provided by the vehicle 10 and corresponding to the first, second and third pieces of information received.

By way of example, the list of power saving profiles comprises the following profiles, but is not limited to the profiles listed below:

- low consumption profile: according to this profile, a first restricted set of applications remain executed, a second restricted set of services are maintained such as for example vehicle location services 10, push-type services, emergency services (automatic alert of a security service in the event of an accident or breakdown, for example) with associated communication parameters such as a low data exchange frequency between the network and the vehicle 10 (for example every 1 minute only) and a reduced size of the data packets exchanged; according to a variant, the communication parameters associated with each service or application vary from one service (from one application, respectively) to another;
- very low consumption profile: according to this profile, the number of applications executed and services maintained is reduced compared to the low consumption profile, the associated communication parameters being configured to reduce consumption by reducing the data exchange frequency, for example (for example every 10 minutes only) and/or by reducing the size of the data packets exchanged; according to a variant, the communication parameters associated with each service or application vary from one service (from one application, respectively) to another;
- extremely low consumption profile: according to this profile, only the applications or services relating to the emergency system(s) are maintained with a very low data exchange frequency (for example every 30 minutes only) and a very small size of data packets.

According to a variant embodiment, the profile most suited to the requirements and to the capacity of the vehicle (defined by the first, second and third pieces of information) is determined by the network on the basis of a virtual image of the communication system of the vehicle 10, such a virtual image corresponding for example to a copy of the applications and services provided by the vehicle 10, a copy of the hardware and software parameters of the vehicle 10 on a network slice of the cloud 100. According to this variant, the network or the cloud is able to test the various profiles and various associated communication parameters making it possible to respond to the request of the vehicle 10 in terms of time during which communication is maintained with the network based on electricity consumption and state of charge information before determining the optimum profile.

According to a third embodiment, the network combines a sleep mechanism (as described according to the first embodiment) of the radio system with a power saving profile (as described according to the second embodiment) to respond to the request of the vehicle 10 in terms of time during which communication is maintained with the network based on the electricity consumption and state of charge information.

According to another alternative embodiment, the first and second pieces of information are transmitted periodically to the network so that the network can adapt the sleep mechanism and/or the power saving profile to the actual electricity consumption of the vehicle 10 and the actual amount of electricity remaining in the battery.

In a fourth operation, the network, for example a cloud server 100, transmits a request to the vehicle 10 to inform it of the power saving mode(s) that have been assigned to the vehicle's communication system 10 by the network, based on the first, second and third pieces of information.

The request(s) is(are) transmitted according to the OTA-type wireless link implemented to receive the first, second and third pieces of information and to exchange the data between the cloud 100 and the vehicle 10.

This request for example comprises a set of communication parameters associated with the power saving mode(s) allocated to the vehicle 10 and defining the power saving mode(s). Applying these settings allows the vehicle to enter the power saving mode(s).

According to a variant, the request(s) transmitted comprise an identifier for each power saving mode assigned, the vehicle 10 having in memory (for example in the memory of a computer of the communication system of the vehicle 10) a look-up table (LUT) associating each identifier with a power saving mode and its associated parameters. According to this variant, the power saving modes that can be implemented by the communication system of the vehicle 10 are predefined and known to the vehicle 10 and to the network.

According to a particular embodiment, the vehicle 10 leaves the power saving mode(s) assigned by the network, for example automatically when one or more of the conditions below are met:

- the vehicle 10 moves and leaves the network cell in which it was parked;
- the battery of the vehicle 10 recharges (for example following the start of the internal combustion engine of the vehicle 10 or following a connection of the battery of the vehicle 10 to a charging station of a public or private electricity supply network);
- driver action to deactivate the power saving mode(s) via an MMI, for example.

Figure 2:
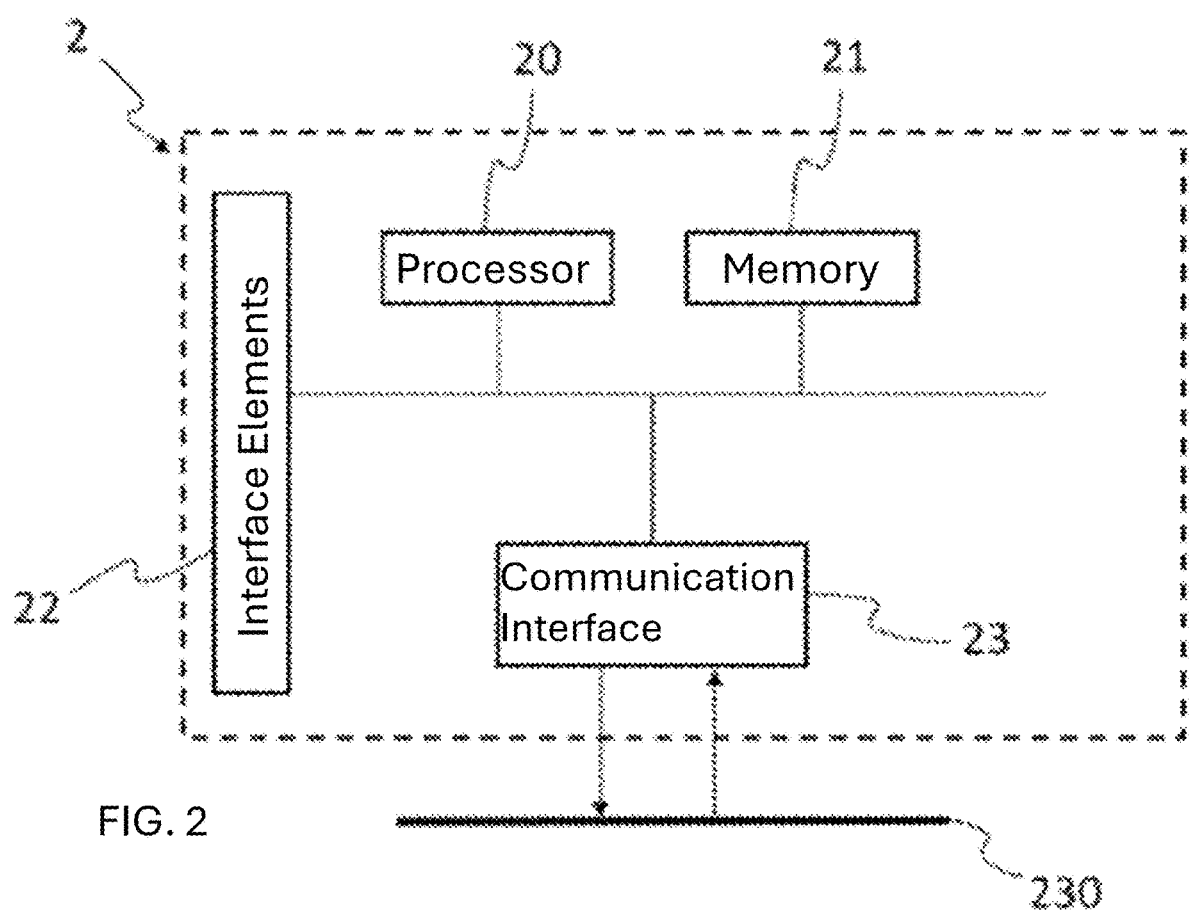
FIG. 2 schematically illustrates a communication device of the network of FIG. 1.

FIG. 2 schematically illustrates a communication device 2 in a public land mobile network infrastructure, according to a particular non-limiting embodiment. The device 2 corresponds for example to a cloud server 100 or to a device on board the vehicle 10 to communicate with the public land mobile network.

Figure 3:
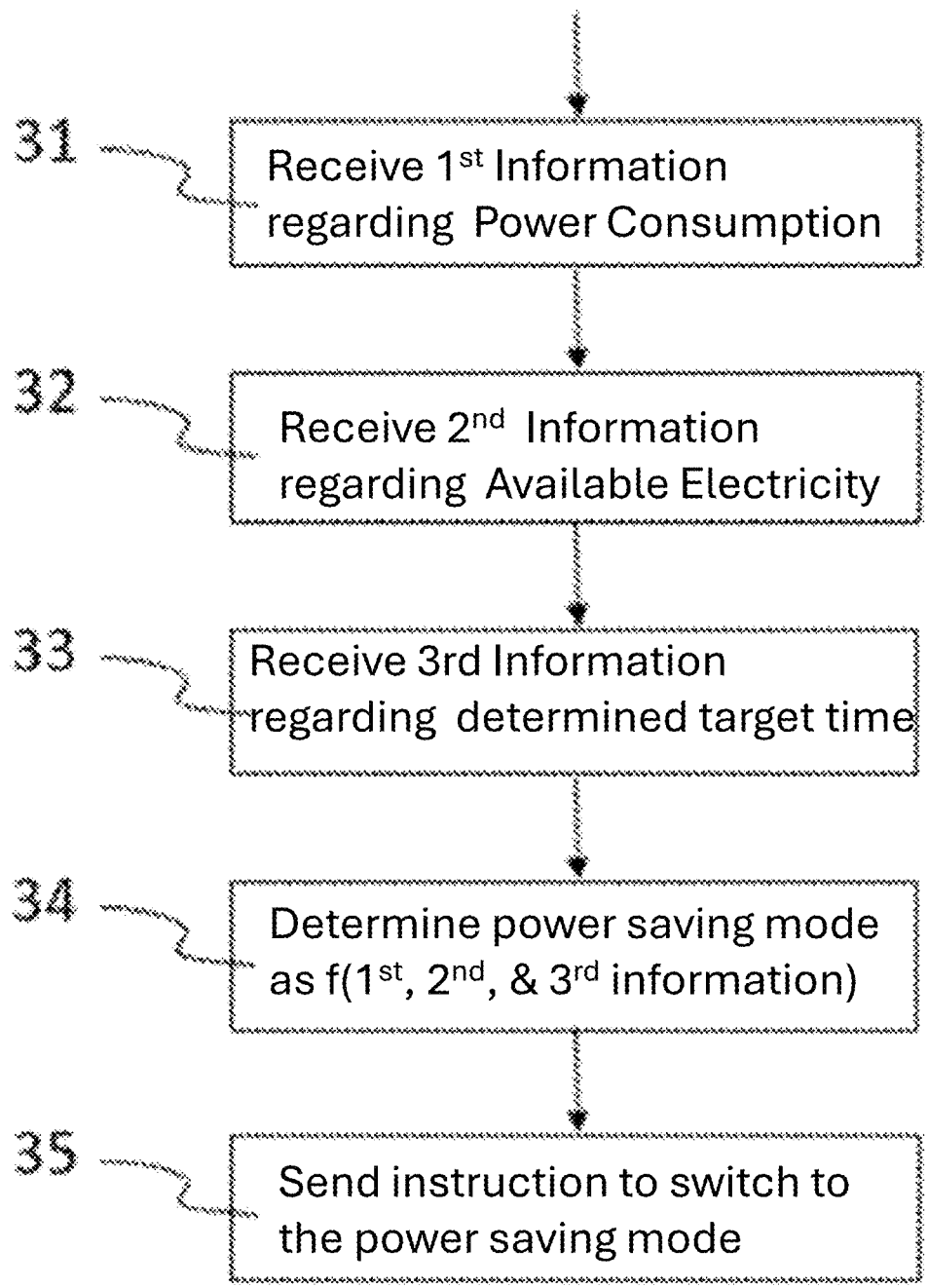
FIG. 3 illustrates a flowchart of the different steps of a communication method between the vehicle of FIG. 1 and the public land mobile network of FIG. 1.

The device 2 is for example configured to implement the operations described with regard to FIG. 1 and/or the steps of the method described with regard to FIG. 3. Examples of such a device 2 comprise, but are not limited to, a server, a computer, a computing device, on-board electronic equipment such as a vehicle's on-board computer, a telematic control unit (TCU), a smartphone, a tablet or a laptop. The elements of the device 2, individually or in combination, can be integrated in a single integrated circuit, in several integrated circuits and/or in discrete components. The computer 2 may be produced in the form of electronic circuits or of software (or computer) modules, or else of a combination of electronic circuits and software modules. According to various particular embodiments, the device 2 is coupled in communication with other devices or similar systems, for example by means of a communication bus or through dedicated input/output ports.

The device 2 comprises one (or more) processor(s) 20 configured to execute instructions for carrying out the steps of the method and/or for executing the instructions of the software embedded in the device 2. The processor 20 may include integrated memory, an input/output interface and various circuits known to those skilled in the art. The device 2 further comprises at least one memory 21 corresponding, for example, to a volatile and/or non-volatile memory and/or comprises a memory storage device that may comprise volatile and/or non-volatile memory, such as EEPROM, ROM, PROM, RAM, DRAM, SRAM, flash, magnetic or optical disk.

The computer code of the on-board software application (s) comprising the instructions to be loaded and executed by the processor is for example stored in the first memory 21.

According to a particular and non-limiting embodiment, the device 2 comprises a block 22 of interface elements for communicating with external devices, for example a remote server or the cloud, a communication system of a vehicle, a computer, or a TCU. The interface elements of the block 22 comprise one or more of the following interfaces:

radiofrequency (RF) interface, for example of the Bluetooth® or Wi-Fi®, LTE (Long-Term Evolution), LTE-Advanced, 3GPP 5G type;

USB ("Universal Serial Bus") interface;

HDMI interface (High-Definition Multimedia Interface).

Data are for example loaded into the device 2 via the interface of the block 22 using a 4G (or LTE Advanced according to 3GPP release 10-version 10) or 5G network.

According to another particular embodiment, the device 2 comprises a communication interface 23 that makes it possible to establish communication with other devices, such as for example the GPS-type location system, the mobile communication system (GSM, GPRS, Wi-Fi, Bluetooth, LTE, LTE-V, ITS G5) or radars of the speed camera system via a communication channel 230. The communication interface 23 for example corresponds to a transmitter configured to transmit and receive information and/or data via the communication channel 230. The communication interface 23 corresponds for example to a wired network of the CAN (Controller Area Network), CAN FD (Controller Area Network Flexible Data-Rate), Ethernet Automotive, FlexRay (according to standard ISO 17458) or Ethernet (according to standard ISO/IEC 802.3) type.

According to an additional particular embodiment, the device 2 can supply output signals to one or more external devices, such as a display screen, one or more loudspeakers and/or other peripherals respectively via output interfaces, not shown.

FIG. 3 illustrates a flowchart of the different steps of a communication method between a communication system of a vehicle and a public land mobile network, according to a particular and non-limiting embodiment. The method is advantageously implemented in the network (for example in one or more servers), for example implemented by the device 2 of FIG. 2.

In a first step 31, a first piece of information representing the power consumption of the vehicle is received.

In a second step 32, a second piece of information representative of an amount of electricity available in the vehicle is received.

In a third step 33, a third piece of information representative of a determined target time for maintaining a connection between the communication system and the network is received.

In a fourth step 34, at least one power saving mode to be assigned to the communication system of the vehicle is determined as a function of the first piece of information, the second piece of information and the third piece of information.

In a fifth step 35, an instruction to switch to the at least one determined power saving mode is sent to the communication system of the vehicle.

According to a variant, steps 31 to 35 are repeated to take into account the variations in the power consumption of the vehicle 10, its needs and the revolution in the amount of power available.

Of course, the claimed invention is not limited to the embodiments described above, but extends to a method for managing the communication between a vehicle and a network, and to the device configured for the implementation of such a method. The claimed invention also relates to a method for managing power in a vehicle, and the device configured for the implementation of such a method.

The claimed invention also relates to a system comprising one or more vehicles, for example an automobile or more generally a land motor vehicle, communicating with one or more servers or devices of the network such as the device 2.

The invention claimed is:

1. A method of communication between a communication system of a vehicle and a public land mobile network, said vehicle being static in a cell of said network, said method being implemented by said network, said method comprising the following steps:

receiving a first piece of information representative of the power consumption of said vehicle;

receiving a second piece of information representative of an amount of electricity available in said vehicle;

receiving a third piece of information representative of a determined target time for maintaining a connection between said communication system and said network;

determining at least one power saving mode to be assigned to said communication system of the vehicle as a function of said first piece of information, said second piece of information and said third piece of information; and sending said communication system of the vehicle an instruction to switch to said at least one determined power saving mode;

wherein said step of determining at least one power saving mode comprises selecting a power saving profile from among a plurality of power saving profiles, each profile of said plurality of power saving profiles being associated with a set of applications and/or services to be kept active with a set of associated communication parameters, said set of communication parameters comprising:

a frequency of data exchanges; and/or a data packet size.

2. The method according to claim 1, wherein said step of determining at least one power saving mode comprises selecting a mechanism for putting said communication system of the vehicle to sleep at regular intervals of determined duration from among a plurality of mechanisms supported by said network.

3. The method according to claim 2, wherein said plurality of mechanisms comprises:

power saving mode (PSM) mechanism;

discontinuous reception (DRX) mechanism;

extended discontinuous reception (eDRX) mechanism; and connected mode discontinuous reception (CDRX) mechanism.

4. The method according to claim 1, wherein said plurality of power saving profiles comprises a profile for which only one or more emergency services are kept active.

5. The method according to claim 1, wherein said selection of a power saving profile is based on a virtual image of said communication system of said vehicle recorded in said network.

6. A device included in a public land mobile network, said device comprising a memory associated with a processor configured to implement the steps of the method according to claim 1.

7. A communication system comprising the device according to claim 6 and at least one vehicle connected to said public land mobile network via a wireless link.

8. A computer program product comprising instructions stored on a non-volatile memory suitable for executing the steps of the method according to claim 1, when the computer program is executed by at least one processor.

* * * * *